United States Patent
Al-Towailib et al.

(10) Patent No.: US 11,752,639 B2
(45) Date of Patent: Sep. 12, 2023

(54) ENGINEERING DRAWING REVIEW USING ROBOTIC PROCESS AUTOMATION

(71) Applicant: Saudi Arabian Oil Company, Dhahran (SA)

(72) Inventors: Laila Abdulazeem Al-Towailib, Dhahran (SA); Isa Majed Almarzoug, Dhahran (SA); Jameel Dawod Al-Khalaf, Dammam (SA); Ali Hassan AbdRabNabi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 43 days.

(21) Appl. No.: 17/581,627

(22) Filed: Jan. 21, 2022

(65) Prior Publication Data
US 2023/0234240 A1 Jul. 27, 2023

(51) Int. Cl.
*B25J 13/08* (2006.01)
*B25J 9/16* (2006.01)

(52) U.S. Cl.
CPC .............. *B25J 13/08* (2013.01); *B25J 9/163* (2013.01); *G05B 2219/35012* (2013.01)

(58) Field of Classification Search
CPC .. B25J 13/08; B25J 9/163; G05B 2219/35012
(Continued)

(56) References Cited

U.S. PATENT DOCUMENTS 3,684,871 A * 8/1972 Schaffner ............... G06Q 10/06
358/1.3
4,845,651 A * 7/1989 Aizawa ................... G06T 17/10
345/581
(Continued)

FOREIGN PATENT DOCUMENTS

CN 101882225 A 11/2010
CN 101388079 B 6/2011
(Continued)

OTHER PUBLICATIONS

Solidworks Inspection, 3D Experience, Dassault Systemes & GoEngineer, Oct. 14, 2019.
(Continued)

*Primary Examiner* — Jaime Figueroa
(74) *Attorney, Agent, or Firm* — Leason Ellis LLP (57) ABSTRACT

A computing device is configured to receive information representing an electronic drawing. The information is processed to locate and access the electronic drawing. Moreover, a template configuration file is accessed that corresponds with a category of the electronic drawing. Using the template configuration file, the at least one computing device can generate an item specification that includes information representing items to be reviewed for compliance with at least one rule. For each respective one of the items in the item specification, the respective item is determined to be present in the electronic drawing and complies with at least one rule identified in the template configuration file. Further, information is generated representing whether the respective item is present in the electronic drawing and complies with at least one rule identified in the template configuration file. The generated information is transmitted to at least one computing device.

20 Claims, 6 Drawing Sheets

(58) Field of Classification Search
USPC .............. 700/245–264; 318/568.11–568.25
See application file for complete search history.

(56) References Cited

U.S. PATENT DOCUMENTS

| | | | | |
|---|---|---|---|---|
| 4,933,865 A * | 6/1990 | Yamamoto | ........... | G06V 30/422 700/182 |
| 5,251,268 A * | 10/1993 | Colley | ................ | G06V 30/422 706/45 |
| 5,323,311 A * | 6/1994 | Fukao | .................... | G06F 40/58 704/8 |
| 5,341,469 A * | 8/1994 | Rossberg | ............... | G06Q 10/06 715/205 |
| 5,625,798 A * | 4/1997 | Badders | ............. | G05B 19/4097 700/83 |
| 5,633,995 A * | 5/1997 | McClain | ................ | G06T 15/10 345/419 |
| 5,761,328 A * | 6/1998 | Solberg | ............... | G06V 30/422 382/113 |
| 6,224,249 B1 * | 5/2001 | Ozawa | .................... | G06F 30/00 715/219 |
| 6,614,929 B1 * | 9/2003 | Yokota | ................. | G06V 30/412 382/175 |
| 6,941,000 B2 * | 9/2005 | Wong | ................... | G06V 30/422 382/113 |
| 7,120,318 B2 * | 10/2006 | Tyan | ................. | G06V 30/1444 707/E17.022 |
| 7,392,480 B2 * | 6/2008 | Harrison | ................ | G06F 30/00 715/964 |
| 7,587,061 B1 * | 9/2009 | Pacenti | ............... | G06V 30/422 382/100 |
| 7,653,245 B2 * | 1/2010 | Love | ....................... | G06F 16/56 715/849 |
| 8,472,726 B2 * | 6/2013 | Gronau | ................. | G06V 10/98 717/124 |
| 8,768,651 B2 | 7/2014 | Bhaskaran et al. | | |
| 8,990,681 B2 | 3/2015 | Hartmann et al. | | |
| 9,459,600 B2 * | 10/2016 | Huffine | ................... | G05B 13/04 |
| 9,465,801 B2 * | 10/2016 | Tripathi | ................... | G06F 16/93 |
| 2002/0009223 A1 * | 1/2002 | Wong | .................... | G06V 30/422 382/154 |
| 2004/0177089 A1 * | 9/2004 | Love | ........................ | G06F 16/56 |
| 2004/0236711 A1 * | 11/2004 | Nixon | ..................... | G06F 16/56 707/E17.031 |
| 2004/0267401 A1 * | 12/2004 | Harrison | ................. | G06F 30/00 700/98 |
| 2005/0256874 A1 | 11/2005 | Chiba et al. | | |
| 2009/0052751 A1 * | 2/2009 | Chaney | .................... | G06F 21/33 382/120 |
| 2009/0219567 A1 * | 9/2009 | Ishizaki | ............... | G06V 30/412 358/1.15 |
| 2012/0036424 A1 | 2/2012 | Prast | | |
| 2013/0166255 A1 * | 6/2013 | Chang | ................... | G06T 7/0006 703/1 |
| 2014/0099002 A1 * | 4/2014 | Kim | ........................ | H04N 1/23 382/113 |
| 2015/0324495 A1 * | 11/2015 | Kling | .................... | G06Q 10/06 703/1 |
| 2019/0354349 A1 * | 11/2019 | Gutierrez | ................ | G06F 30/20 |
| 2020/0387788 A1 * | 12/2020 | Alves | ..................... | G06F 30/12 |

FOREIGN PATENT DOCUMENTS

| | | |
|---|---|---|
| CN | 110378048 A | 10/2019 |
| CN | 110378206 A | 10/2019 |

OTHER PUBLICATIONS

How to Print or Convert DWG files to PDF without AutoCAD, Foldermill, Aug. 7, 2019.

Juhee Rho et al., "Automated BIM generation using drawing recognition and line-text extraction", Journal of Asian Architecture and Building Engineering, Sep. 2020.

* cited by examiner

ENGINEERING DRAWING REVIEW USING ROBOTIC PROCESS AUTOMATION

FIELD OF THE DISCLOSURE

This patent application relates, generally, data processing and management and, more particularly, to improving engineering drawings quality and review processes.

BACKGROUND OF THE DISCLOSURE

Engineering drawings require detailed review processes to ensure accuracy and compliance with standards and protocols. For example, one type of engineering drawing review includes verifying that pre-defined templates and rules regarding the format and placement of metadata within the drawing are followed. Engineering drawing typically go through multiple stages requiring different types of reviews.

Unfortunately, engineering drawing review processes are time-consuming, prone to error, and expensive. It is with respect to these and other concerns that the present disclosure is provided.

SUMMARY OF THE DISCLOSURE

In one or more implementations, a method and system are disclosed for engineering drawing quality review. At least one computing device is configured by executing instructions to receive information representing an electronic drawing. The information representing the electronic drawing is processed by the at least one computing device, including to locate and access the electronic drawing. Moreover, the at least one computing device is configured to access a template configuration file that corresponds with a category of the electronic drawing. Using the template configuration file, the at least one computing device can generate an item specification, wherein the item specification includes information representing items to be reviewed in the electronic drawing for compliance with at least one rule identified in the template configuration file. For each respective one of the items in the item specification, the at least one computing device is configured to determine whether the respective item is present in the electronic drawing and complies with at least one rule identified in the template configuration file. Further, the at least one computing device is configured to generate information representing whether the respective item is present in the electronic drawing and complies with at least one rule identified in the template configuration file. The generated information is transmitted to at least one computing device.

In one or more implementations, determining whether the respective item is present in the electronic drawing further comprises accessing in the item specification, by the at least one computing device, at least two coordinates associated with the respective item. The at least two coordinates represent a location in the electronic drawing where the respective item is located. Further, the at least one computing device is configured to process the electronic drawing using the at least two coordinates to locate the respective item in the electronic drawing.

In one or more implementations, determining whether the respective item complies with at least one rule identified in the template configuration file further comprises accessing in the item specification at least one rule associated with the respective item. The at least one computing device is further configured to process the electronic drawing to extract the respective item from the electronic drawing. Further the at least one computing device is configured to compare the extracted respective item with the at least one rule.

In one or more implementations, determining whether the respective item is present in the electronic drawing further comprises identifying, by the at least one computing device using information in the template configuration file, that the respective item includes a plurality of words, a plurality of numbers, or a combination of at least one word and at least one number. The at least one computing device is configured to process the electronic drawing to extract each of the plurality of words, the plurality of numbers, or the combination of at least one word and at least one number. The at least one computing device is further configured to concatenate the extracted plurality of words, the extracted plurality of numbers, or the extracted combination of at least one word and at least one number.

In one or more implementations, generating the information representing whether the respective item is present in the electronic drawing and complies with at least one rule identified in the template configuration file comprises updating the item specification.

In one or more implementations, the at least one computing device is further configured with robotic process automation. The steps of receiving the information representing an electronic drawing, processing the information representing the electronic drawing to locate and access the electronic drawing, accessing the template configuration file, generating the item specification, determining whether the respective item is present and complies with the at least one rule, generating the information, and transmitting the information occur automatically as a function of the at least one computing device executing the robotic process automation.

In one or more implementations, the at least one computing device is further configured to convert the electronic drawing from a first file format to a second file format prior to determining whether the respective item is present in the electronic drawing.

In one or more implementations, the at least one computing device is configured to generate the template configuration file prior to receiving the information representing the electronic drawing. The template configuration file can further include information regarding where respective items within an engineering drawing are located, and quality control checks that are to be performed on the data items and/or categories.

In one or more implementations, generating the information representing whether the respective item is present in the electronic drawing and complies with at least one rule identified in the template configuration file further comprises generating, by the at least one computing device, a report. The report identifies each respective item identified in the template configuration file and whether respective item complies with the at least one rule identified in the template configuration file. Further, the report is transmitted to at least one other computing device.

In one or more implementations, the electronic drawing is an engineering drawing.

Additional features, advantages, and embodiments of the disclosure may be set forth or apparent from consideration of the detailed description and drawings. It is to be understood that the foregoing summary of the disclosure and the following detailed description and drawings provide non-limiting examples that are intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced.

DETAILED DESCRIPTION OF CERTAIN EMBODIMENTS ACCORDING TO THE DISCLOSURE

By way of overview and introduction, the present disclosure presents technical method(s) and system(s) which provide integrated solutions to improve quality of engineering drawings. The present disclosure improves automation technology associated with engineering drawing review and quality control, including by applying robotic programming that configures a computing device to locate and identify content in an engineering drawings automatically. The computing device further processes the identified content to generate information representing the drawing, the content in the drawing, the purpose of the drawings, or other relevant information associated with the drawing.

Engineering drawings have standards and procedures that govern aspects of the drawings, as well as data in engineering drawings, and data associated with engineering drawings. For example, format of data, patterns of data, data values, or other aspects of data that are located within engineering drawings must comply with respective standards and procedures. The present disclosure includes one or more computing devices configured using robotic process automation (RPA) to automate the processes to locate and identify information in engineering drawings and generate information associated therewith. Processes are automated using RPA, which improves efficiency, is more cost effective, and improves the quality of engineering drawings, as well as drawings review and drawings use.

In one or more implementations, a review process is automatically conducted to review and process information in an engineering drawing, including to verify compliance with templates and rules. For example, processes are executed by a computing device to determine that metadata in the drawing is laid out in accordance with one or more standards. The computing device can identify respective sections of engineering drawings, such as the "Title Block" section, to locate information such as drawing name, plant number, title, location, certifier, referenced drawings, or the like, and to recognize the information and verify that the information complies with one or more engineering rules. The review process executed by the computing device can also verify that an engineering drawing is drafted using a proper, pre-defined border file, as well as other aspects, such as whether the drawing has red-lining, whether the drawing has a logo, or whether the drawing is of an appropriate size in view of one or more standards. The present disclosure automates review processes to ensure, for example, engineering drawing quality and accuracy and by applying RPA technology.

The present disclosure provides a ubiquitous solution by providing the engineering drawings review and processing disclosed herein regardless of the original file format of the engineering drawing, which may be proprietary to one or more respective computer-aided design ("CAD") applications, including AUTOCAD and MICROSTATION. For example, one or more processes can be executed by a computing device to generate a copy of an engineering drawing in a respective file format, such as portable document format ("PDF"), which is processed in accordance with the teachings herein. Accordingly, the present disclosure includes a computing device configured to create or convert engineering drawings to a respective (e.g., PDF) format, and process the created or converted engineering drawing to be validated using respective quality check items.

The present disclosure further includes configuring a computing device to generate respective engineering drawing template configuration files that are respectively associated with categories of engineering drawings. The template configuration files can be defined in accordance with respective kinds and characteristics of engineering drawings. For example, a template configuration file can be generated that includes data representing categories and items that are required of a respective engineering drawing. The template configuration file can further include information regarding where respective items within an engineering drawing are to be located, and quality control checks that are to be performed on the data items and/or categories. Depending on a respective implementation of the present disclosure, the template configuration file can be formatted as a file containing comma-separated values, a spreadsheet file, a data structure, an XML file, or other suitable file format.

More particularly, engineering drawing template configuration files can include various details associated with categories of engineering drawings and/or particular engineering drawings. For example, and without limitation, information in a template configuration file can include the drawing's sheet size, file identifier, border information, one or more reference drawings, one or more drawing types, title, date, spacing, revision history, plant number, descriptions, or other suitable information.

Figure 1:
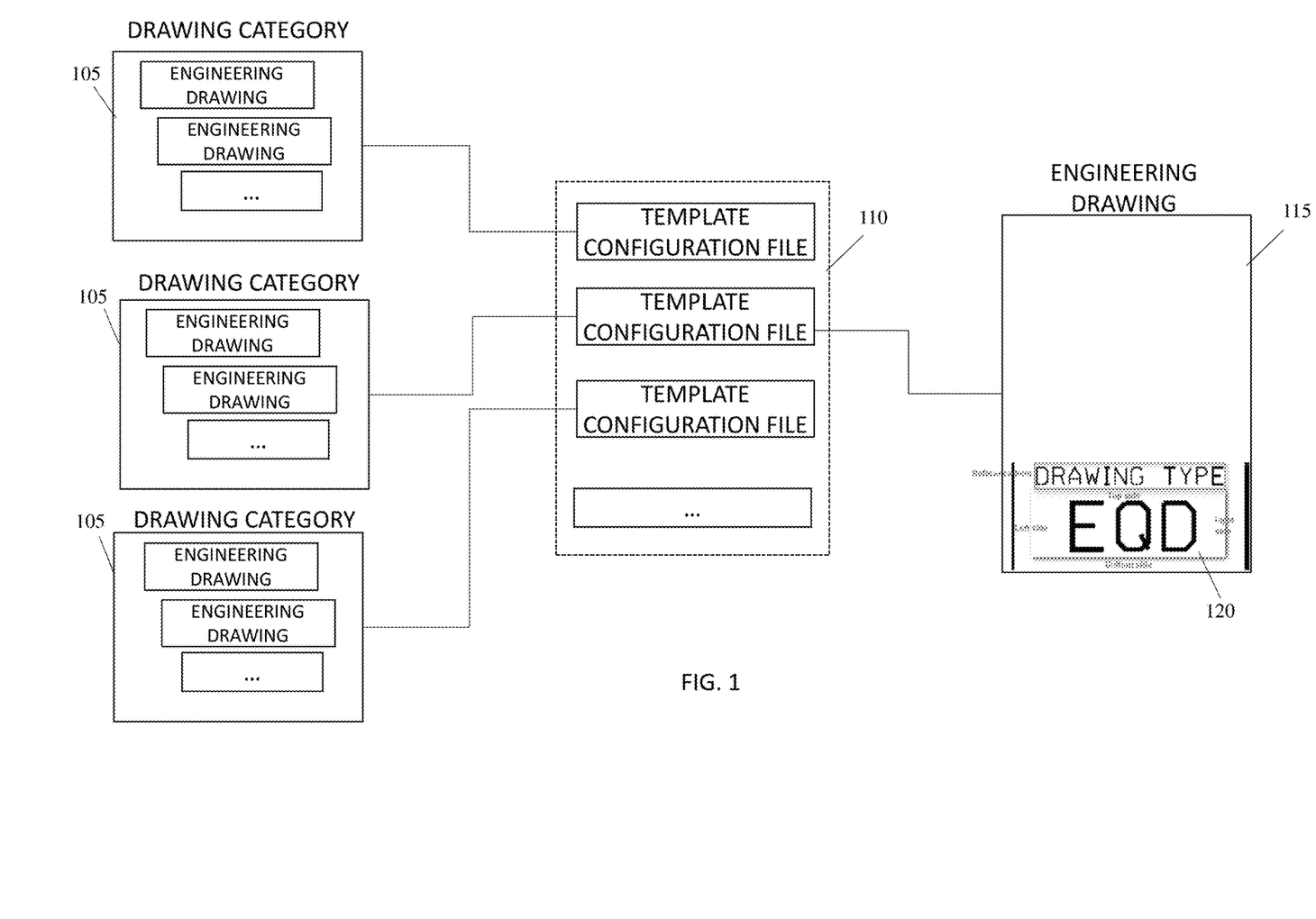
FIG. 1 is a block diagram illustrating aspects of the present disclosure, including drawing categories, template configuration files, and a respective engineering drawing.

FIG. 1 is a block diagram illustrating aspects of the present disclosure, including drawing categories 105, template configuration files 110, and a respective engineering drawing 115. Correlations between respective ones of categories 105, template configuration files 110, and a respective engineering drawing are represented in FIG. 1 by connecting lines. For example, and as shown in FIG. 1, several engineering drawings that share common features and requirements can belong to a single drawing category 105. Each engineering drawing category 105 can have an associated template configuration file that is generated in accordance with the teachings herein. For example, all engineering drawings that belong to a respective category 105 are required to have a particular kind of metadata at a respective location within the drawing and formatted in a particular way. A corresponding template configuration file for that category 105 is generated to identify those requirements and is used during the review process to ensure that the standards associated with the engineering drawing are met.

In one or more implementations, an RPA software bot is configured via one or more computing devices to execute on command, on schedule, or both on command and on a schedule. While executing, the RPA software bot accesses information which represents one or more respective engineering drawings to be processed in accordance with the teachings herein. The information can be transmitted from a respective source (e.g., emailed or otherwise transferred to the RPA software bot), or the RPA software bot can access a data source, e.g., a task list or other data source, for information identifying the respective engineering drawing or drawings to be processed. Thereafter, one or more processing steps are executed by the RPA software bot to access the engineering drawing, such as to locate and download the engineering drawing and access (e.g., open) the engineering drawing. In one or more implementations, a copy of the engineering file is generated in a respective file format, or an existing engineering drawing is converted to the respective file format. For example, a CAD file is accessed and a copy generated as a PDF file, which is accessed and processed in accordance with the present disclosure.

After the respective engineering drawing is identified for processing, information representing a corresponding template configuration file, e.g., a "Template ID," is extracted, as well as rules and standards to which the engineering drawing is built. Data points identified in the defined template configuration file are used by a computing device to validate the quality of the engineering drawing. For example, the completeness and accuracy of the engineering drawing are validated for including data points that are correctly provided (e.g., located and formatted) in the engineering drawing. Accordingly, the respectively associated drawing template configuration file can include data that are to be validated during the review process for the engineering drawing. In one or more implementations, a computing device accesses the template configuration file and generates an item specification, which can be configured as a list or other structure, that represents respective items to be reviewed and validated in the engineering drawing.

In addition, quality control processes can be performed, such as to verify the data extracted from engineering drawings. Data can be checked against data elements outlined in a respective predefined template to verify the quality of the engineering drawing. Thereafter, information can be output, such as in the form of a validation report, that identifies the results of the review process and corresponding verification checks that were performed. For example, results of review and verification can be provided in a spreadsheet file that includes information representing an engineering drawing, data field names, respective values in the engineering drawing that were checked, respective data filters, a determination whether a review was partial or complete, location information associated with visible objects in a drawing, information representing whether an exact match was identified, and border information. More generally, a drawing review report can be generated and transmitted to one or more devices that represents that a respective engineering drawing was reviewed, as well as the type of the drawing, a number of revisions made to the drawing, and reasons for drawing rejections, if any, in view of non-compliance, such as missing data, data that are not formatted properly, data that are not located at correct positions, or the like.

In one or more implementations of the present disclosure, an engineering drawing is processed by one or more computing device that uses RPA technology to extract all visible text items from any graphical user interface (GUI) element, along with the rectangle spaces containing them. As used herein, the rectangle is identified by X and Y coordinates representing the top-left corner and the rectangle's height and width. In such implementations, a PDF or other document of a suitable file format is passed as a GUI element, which is acted on by RPA processes to extract text items therein.

After items, including textual items, have been extracted from an engineering drawing, a process can loop through each of items, including to determine, using mathematical calculations, whether an item is vertically oriented or horizontally oriented. Furthermore, font size of the text items is determined and, depending upon the respective X, Y coordinates, the orientation of the text, and the test item's font size, words can be determined for concatenation, thereby creating new textual objects comprised in a respective text and rectangle. In order to ensure accuracy, validation of various configuration can take place. For example, a static textual item, such as company name, label, or title, is identified. Thereafter, an area relevant to the static text item specified in order to extract textual items therefrom. All textual content within in the specified area is extracted and, thereafter, validated via business validation logic.

Continuing with reference to FIG. 1, portion 120 of the example engineering drawing 115 that is processed including a reference item, as well as landmarks that can be used to locate and extract textual items (e.g., the left side, bottom side, right side, and top side). For example, the following parameters can be used by one or more computing devices executing RPA to process an engineering drawing in accordance with an example implementation.

Filter="DRAWINGTYPE", Partial=false, Near="RB", LeftMinOffset="L−1", LeftMaxOffset="R+0", TopMinOffset="B+0", TopMaxOffset="B+3H"

According to this example, the RPA process operates to identify the drawing type. All text items starting from the right-bottom corner of the engineering drawing (Near="RB") are identified for the text "Drawing Type," where case and spaces are ignored (Filter="DRAWINGTYPE", Partial=false). The first textual item that is identified can be used as reference. Other textual items that are located in the area below are identified where the left side is 1 unit to the left of the reference item (LeftMinOffset="L−1"), the right side is the right border of the reference item (LeftMaxOffset="R+0"), the top side is the bottom of the reference item (TopMinOffset="B+0"), and the bottom side is 3 times the height of the reference item below the bottom of the reference item (TopMaxOffset="B+3H"). Once the text item(s) are extracted, they can be passed to one or more modules, such as a business validation module for further processing and use.

Figure 2:
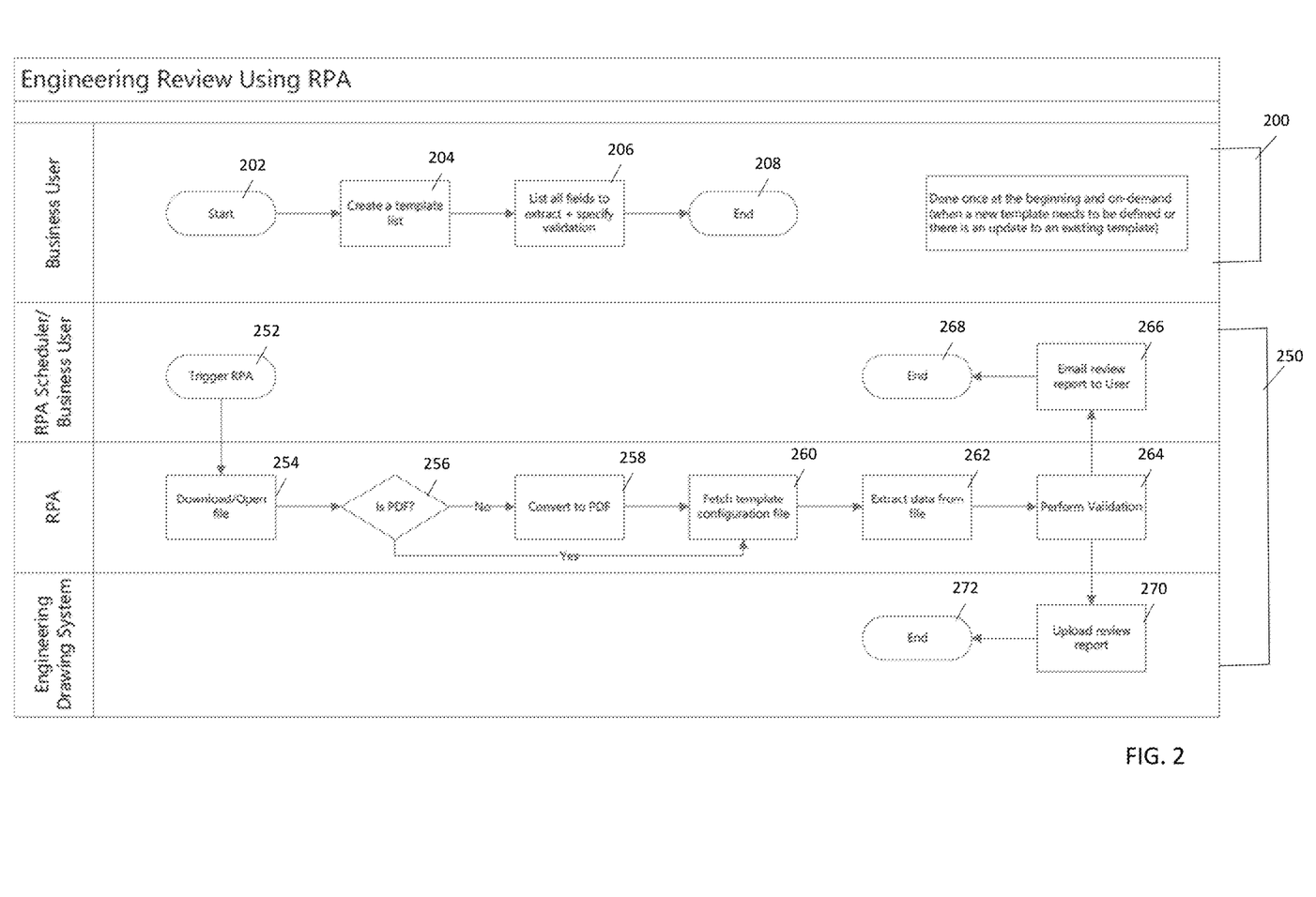
FIG. 2 is a flow diagram illustrating steps associated with an example high-level process, in accordance with an implementation of the present disclosure.

FIG. 2 is a flow diagram illustrating steps associated with an example process, in accordance with an implementation of the present disclosure. It is to be appreciated that several of the logical operations described herein can be implemented as a sequence of computer-implemented acts or program modules running on one or more computing devices. Accordingly, the operations described herein, including logical operations, are referred to variously as operations, steps, structural devices, acts and modules can be implemented in software, in firmware, in special purpose digital logic, and any combination thereof. It should also be appreciated that more or fewer operations can be performed than shown in the figures and described herein. These operations can also be performed in a different order than those described herein.

The algorithmic steps set forth in FIG. 2 illustrate an example high-level process for engineering drawings review, including for defining one or more engineering drawing template configuration files (steps 200) and for processing engineering drawings via an RPA technology (steps 250). At step 202, the process for creating an engineering drawings template 200 begins. At step 204, an engineering template item specification, which can be configured as a list, of data fields is created and, thereafter, at step 206, data fields that are to be extracted and specified for validation are identified. Thereafter, at step 208, the process 200 ends.

Referring to process steps 250, a series of steps are executed by one or more computing devices for processing engineering drawings in accordance with an example implementation. At step 252, the process begins and an RPA software robot process is triggered, for example, in response to a command or to a schedule. At step 254, an engineering drawing is accessed (e.g., downloaded and opened) for processing. At step 256, a determination is made whether the file format of the engineering drawing is suitable (e.g., is a PDF file). If the determination in step 256 is negative, then the process branches to step 258 and the engineering drawing is converted (or otherwise copied) to a file format that is suitable for processing in accordance with the present disclosure. Thereafter, or if the determination in step 256 is positive, the flow proceeds to step 260 and a respective engineering drawings template configuration file is accessed ("fetched"). At step 262, using the respective engineering drawings template configuration file, data from the engineering drawing are extracted. Thereafter, at step 264, validation is performed on the extracted data and the process branches to step 266, where a report representing the review of the engineering drawing is emailed to a computing device. Thereafter, at step 268, the process ends. Alternatively, the process branches at the validation step 264 and a report associated with the review of the engineering drawing is updated at step 270. Thereafter, at step 272, the process ends.

Figure 3:
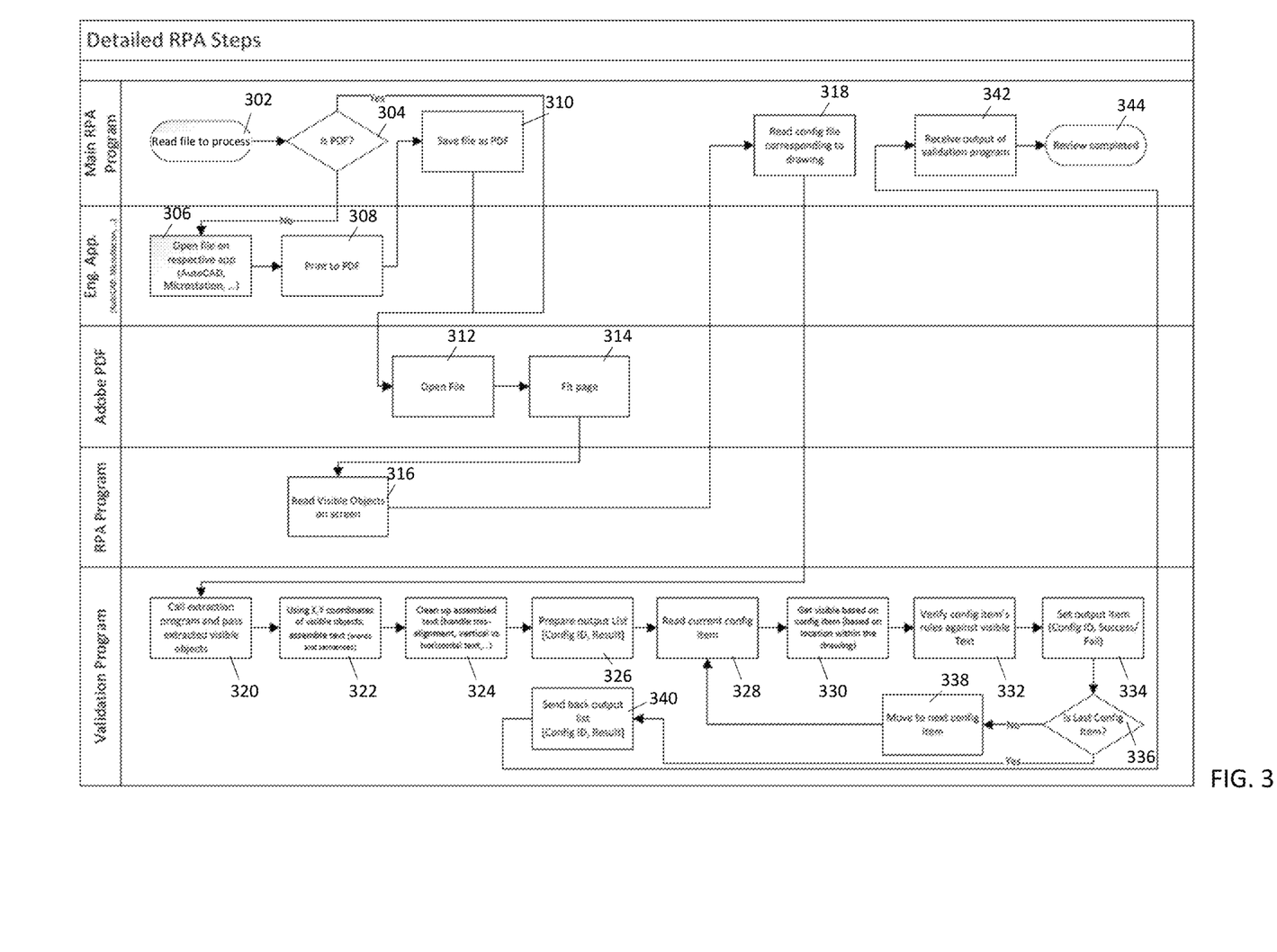
FIG. 3 is a flow diagram illustrating more detailed steps associated with processing engineering drawings, in accordance with an example implementation.

FIG. 3 is a flow diagram illustrating steps associated with processing engineering drawings, in accordance with an example implementation. At step 302, the process begins and an engineering drawing is read for processing. At step 304, a determination is made whether the file format of the engineering drawing is suitable (e.g., is a PDF file). If the determination in step 304 is negative, then the process branches to step 306 and the engineering drawing is opened in a respective application (e.g., AUTOCAD, MICROSTATION, or other suitable computer aided design application). Thereafter, at step 308, the respective application prints the engineering drawing, for example, to a PDF file or other file format that is suitable for processing in accordance with the present disclosure. At step 310, the process continues and a file (e.g., a PDF file) is saved. At step 312, the engineering drawing (i.e., the PDF or other suitably formatted file) is opened by a computing device configured with RPA technology and, at step 314, the engineering drawing is adjusted to fit on a single page.

Continuing with the example process flow shown in FIG. 3, at step 316 visible objects in the engineering drawings file are identified and extracted. Thereafter, at step 318, a template configuration file corresponding to the engineering drawing is accessed ("read") for processing the engineering drawing. The process flows to step 320 and steps associated with validation are performed. In one or more implementations, validation can occur via one or more computing devices executing a validation tool. For example, validation tool can include one or more computer programs and/or libraries that can be utilized during the process to extract text, assemble the text, modify (e.g., clean or correct) text, and validate the text against the template rules. In one or more implementations, a validation tool can be configured to apply visible objects and validation rules as input, process the objects, and return a validation report as output.

Continuing with the example process flow shown in FIG. 3, at step 320, an extraction program is executed on one or more computing devices and the extracted visible objects from step 316 are passed to the extraction program. Depending on one or more implementations, the extraction program may be part of a validation application or, alternatively, may be separate and executed separately. Thereafter, the process continues to step 322 and textual content, such as words and sentences, are assembled. In the example shown in FIG. 3, X and Y coordinates associated with the visible objects are used to identify and assemble the respective visible objects. At step 324, adjustments to assembled are made ("clean up"). For example, issues associated with misalignment, vertical or horizontal orientation, or the like is handled including, for example, via program features set forth in the extraction program executed by one or more computing devices to extract the visible objects from the engineering drawing.

Figure 4:
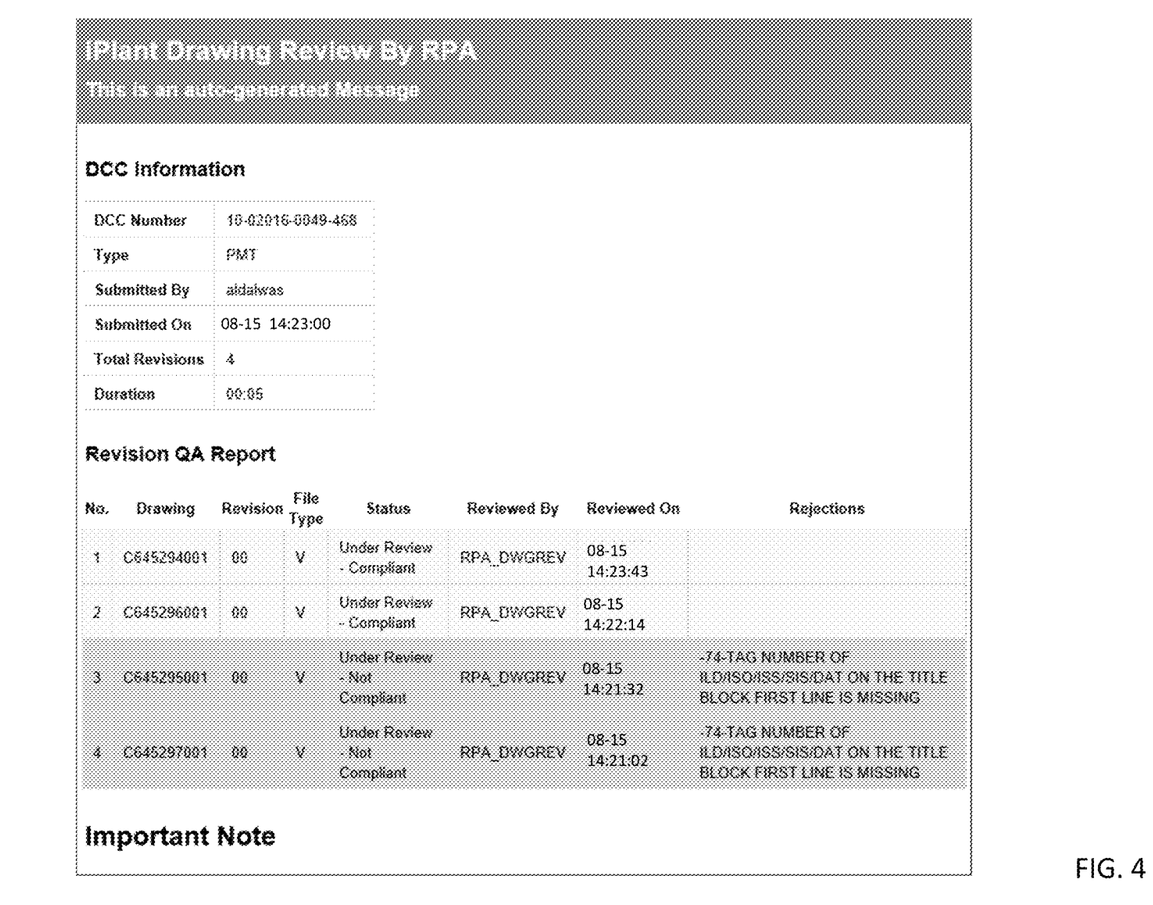
FIG. 4 illustrates an example data report identifying results of an engineer drawing review process, in accordance with an example implementation.

Continuing with the example process flow shown in FIG. 3, at step 326 an item specification, which can be configured as a list or other suitable record, is created, which identifies information for visible objects to be reviewed and verified. For example, the item specification can be an output list formatted as a spreadsheet, a text file, a table, a data structure, or other suitable way. The item specification is generated and includes a configuration ID representing each respective item to review and one or more corresponding rules, such as regarding an expected location of the item, data format rules, data content rules, or the like. Thereafter, at step 328 the current configuration item (e.g., a respective one of the items identified by the template configuration file to be checked in the engineering drawing) is read in the engineering drawing. For example, the current configuration item includes information identifying the item, the expected location of the item in the engineering drawing, and rules for the item, such as relating to formatting, content, or other requirements. At step 330, the respective visible object which corresponds to the current configuration item is located in the engineering drawing. For example, location information for the current configuration item includes the location of the respective visible object where the visible object is located. The computing device configured using RPA technology automatically uses the location information and extracts the textual content of the respective visible object. At step 332, a verification step is performed for the textual content of the respective visible object by referencing one or more rules set forth in the current configuration item. At step 334, information associated with the item in the item specification is generated to represent the results of the verification of the respective visible object. For example, a textual value (e.g., "success," "fail," or the like) or numeric value (e.g., 0 or 1) is added or included with the respective configuration ID of item being verified. In one example implementation, the item specification generated using the template configuration file is updated to reflect the success or failure of the verification for each item in the list. Other implementations are supported, such as to generate one or more new data record for each item, or to generate a new record representing whether the engineering drawing overall has been verified in accordance with rules set forth in the corresponding template configuration file. An example data report identifying results of an engineer drawing review process is shown in FIG. 4.

Continuing with the example process flow shown in FIG. 3, at step 336 a determination is made whether the current configuration item is the last item in the item specification. If not, meaning additional visible objects need to be verified, then the process branches to step 338 and the next configuration item is selected and the process continues back to step 328. Alternatively, if the last configuration item has been verified, then the process branches to step 340 and the updated item specification, which includes the configuration IDs and verification results, is transmitted by a validation application to one or more computing devices executing RPA technology. At step 342, output of the validation process (including, for example, output from the validation application) is provided. Thereafter, at step 344, the process ends.

Thus, as shown and described herein, the present disclosure provides for a technological solution for analyzing and improving quality of engineering drawings. Verification of drawings is automated using RPA and other technology, including as a function of template configuration files, extraction tools, and validation tools that support accurate and timely verification of many kinds of engineering drawings. A newly defined automated workflow provides for technical integration, including by managing engineering applications and packages, to provide operational benefits and enhancements for engineering drawing review. The workflow improves compliance with standards and procedures governing data within the engineering drawings files documents, such as format, patterns, content, and location. The combination of technologies shown and described herein can be integrated with virtually any computer-aided design application, regardless of respective file format that is generated thereby, and improves the quality of engineering drawings in a more a more timely and cost-effective way.

In one or more implementations, a computing device is configured in accordance with the teachings herein to detect information by determining aspects of the drawing, such as alignment and length, and to determine content in the drawing to generate information associated with the determined content. The computing device can be further configured to process the generated information by matching at least some of the content in the drawing with information in at least one associated drawing template configuration file. The computing device can be further configured to verify the completeness and accuracy of the generated information by processing the generated information with information in a respective drawing template configuration file. Information can be output to various channels, including the information that represents results of the processing, or both results of the processing and the generated information, can be output in various ways.

Other technical features are disclosed herein, including file type conversion, such as by converting an engineering drawing from one file format to another. Moreover, data output is provided, including technical reports identifying details associated with engineering drawings review processes and revisions made to engineering drawings as a function thereof.

Figure 5:
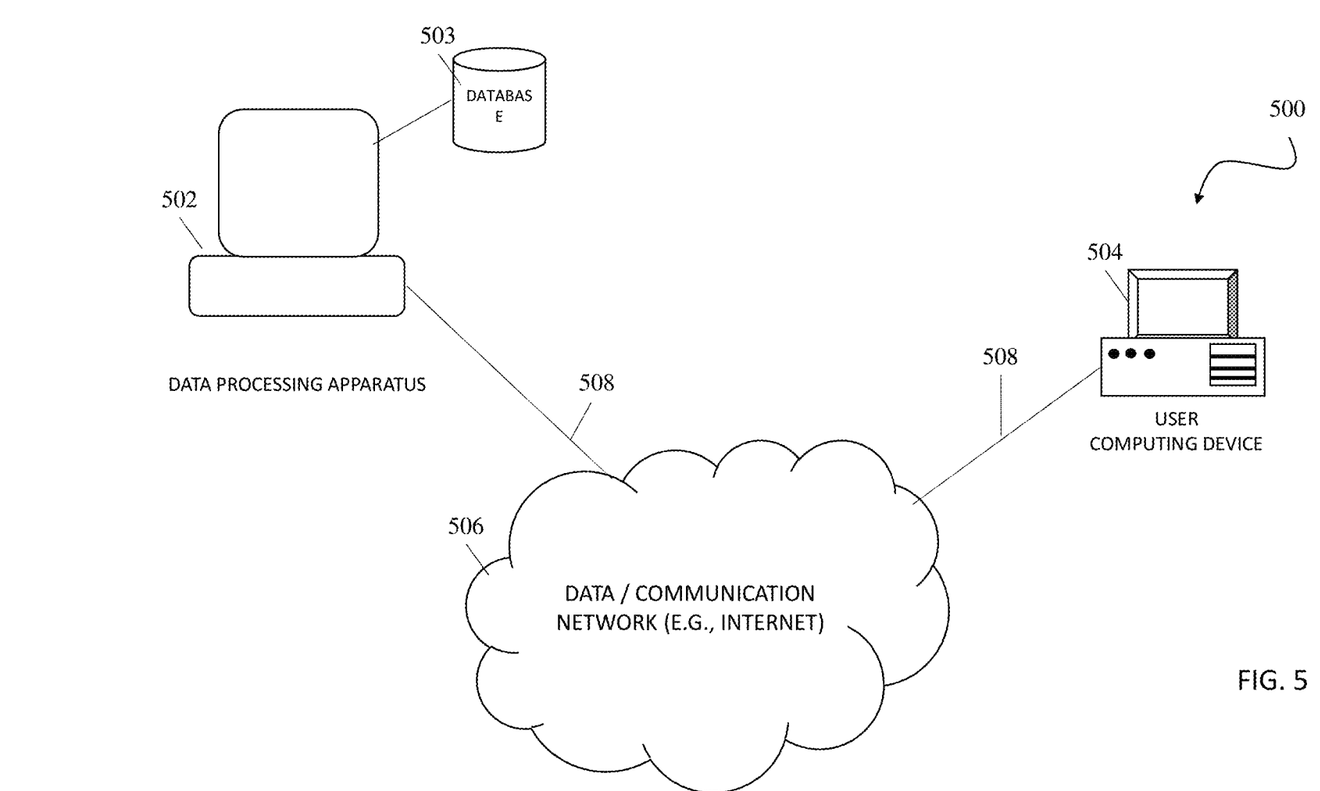
FIG. 5 is a block diagram that shows an example hardware arrangement that operates for providing the systems and methods disclosed herein.

Referring to FIG. 5, a diagram is provided that shows an example hardware arrangement that operates for providing the systems and methods disclosed herein and designated generally as system 500. System 500 can include one or more information processors 502 that are at least communicatively coupled to one or more user computing devices 504 across communication network 506. Information processors 502 and user computing devices 504 can include, for example, mobile computing devices such as tablet computing devices, smartphones, personal digital assistants or the like, as well as laptop computers and/or desktop computers, server computers and mainframe computers. Further, one computing device may be configured as an information processor 502 and a user computing device 504, depending upon operations being executed at a particular time.

With continued reference to FIG. 5, information processor 502 can be configured to access one or more databases 503 for the present disclosure, including source code repositories and other information. However, it is contemplated that information processor 502 can access any required databases via communication network 506 or any other communication network to which information processor 502 has access. Information processor 502 can communicate with devices comprising databases using any known communication method, including a direct serial, parallel, universal serial bus ("USB") interface, or via a local or wide area network.

User computing devices 504 can communicate with information processors 502 using data connections 508, which are respectively coupled to communication network 506. Communication network 506 can be any communication network, but typically is or includes the Internet or other computer network. Data connections 508 can be any known arrangement for accessing communication network 506, such as the public internet, private Internet (e.g. VPN), dedicated Internet connection, or dial-up serial line interface protocol/point-to-point protocol (SLIPP/PPP), integrated services digital network (ISDN), dedicated leased-line service, broadband (cable) access, frame relay, digital subscriber line (DSL), asynchronous transfer mode (ATM) or other access techniques.

User computing devices 504 preferably have the ability to send and receive data across communication network 506, and are equipped with web browsers, software disclosures, or other means, to provide received data on display devices incorporated therewith. By way of example, user computing device 504 may be personal computers such as Intel Pentium-class and Intel Core-class computers or Apple Macintosh computers, tablets, smartphones, but are not limited to such computers. Other computing devices which can communicate over a global computer network such as palmtop computers, personal digital assistants (PDAs) and mass-marked marketed Internet access devices such as WebTV can be used. In addition, the hardware arrangement of the present invention is not limited to devices that are physically wired to communication network 506, and that wireless communication can be provided between wireless devices and information processors 502.

System 500 preferably includes software that provides functionality described in greater detail herein, and preferably resides on one or more information processors 502 and/or user computing devices 504. One of the functions performed by information processor 502 is that of operating as a web server and/or a web site host. Information processors 502 typically communicate with communication network 506 across a permanent i.e., un-switched data connection 508. Permanent connectivity ensures that access to information processors 502 is always available.

Figure 6:
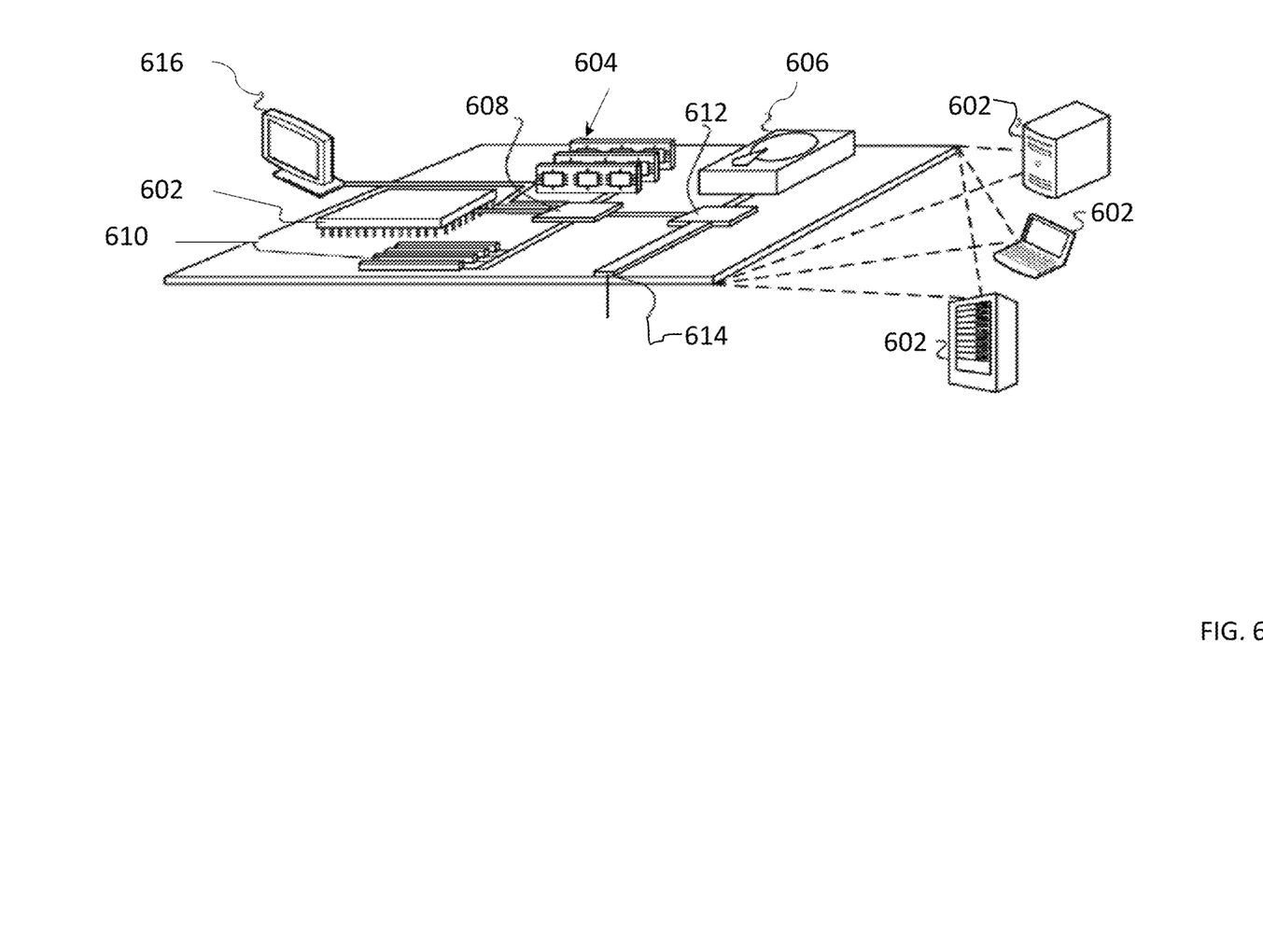
FIG. 6 shows an example of an information processor that can be used to implement the techniques described herein the present disclosure.

FIG. 6 shows an example information processor 502 that can be used to implement the techniques described herein.

The information processor 502 is intended to represent various forms of digital computers, such as laptops, desktops, workstations, personal digital assistants, servers, blade servers, mainframes, and other appropriate computers. The components shown in FIG. 6, including connections and relationships, and their functions, are meant to be exemplary only, and are not meant to limit implementations of the inventions described and/or claimed in this document.

The information processor 502 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and can be mounted on a common motherboard or in other manners as appropriate. The processor 602 can process instructions for execution within the information processor 502, including instructions stored in the memory 604 or on the storage device 606 to display graphical information for a GUI on an external input/output device, such as a display 616 coupled to the high-speed interface 608. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 604 stores information within the information processor 502. In some implementations, the memory 604 is a volatile memory unit or units. In some implementations, the memory 604 is a non-volatile memory unit or units. The memory 604 can also be another form of computer-readable medium, such as a magnetic or optical disk.

The storage device 606 is capable of providing mass storage for the information processor 502. In some implementations, the storage device 606 can be or contain a computer-readable medium, e.g., a computer-readable storage medium such as a floppy disk device, a hard disk device, an optical disk device, or a tape device, a flash memory or other similar solid-state memory device, or an array of devices, including devices in a storage area network or other configurations. A computer program product can also be tangibly embodied in an information carrier. The computer program product can also contain instructions that, when executed, perform one or more methods, such as those described above. The computer program product can also be tangibly embodied in a computer- or machine-readable medium, such as the memory 604, the storage device 606, or memory on the processor 602.

The high-speed interface 608 can be configured to manage bandwidth-intensive operations, while the low-speed interface 612 can be configured to manage lower bandwidth-intensive operations. Of course, one of ordinary skill in the art will recognize that such allocation of functions is exemplary only. In some implementations, the high-speed interface 608 is coupled to the memory 604, the display 616 (e.g., through a graphics processor or accelerator), and to the high-speed expansion ports 610, which can accept various expansion cards (not shown). In an implementation, the low-speed interface 612 is coupled to the storage device 606 and the low-speed expansion port 614. The low-speed expansion port 614, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

As noted herein, the information processor 502 can be implemented in a number of different forms, as shown in the figure. For example, it can be implemented as a standard server, or multiple times in a group of such servers. In addition, it can be implemented in a personal computer such as a laptop computer. It can also be implemented as part of a rack server system. Alternatively, components from the computing device 200 can be combined with other components in a mobile device (not shown), such as a mobile computing device.

The terms "a," "an," and "the," as used in this disclosure, means "one or more," unless expressly specified otherwise.

The term "communicating device," as used in this disclosure, means any hardware, firmware, or software that can transmit or receive data packets, instruction signals or data signals over a communication link. The hardware, firmware, or software can include, for example, a telephone, a smart phone, a personal data assistant (PDA), a smart watch, a tablet, a computer, a software defined radio (SDR), or the like, without limitation.

The term "communication link," as used in this disclosure, means a wired and/or wireless medium that conveys data or information between at least two points. The wired or wireless medium can include, for example, a metallic conductor link, a radio frequency (RF) communication link, an Infrared (IR) communication link, an optical communication link, or the like, without limitation. The RF communication link can include, for example, Wi-Fi, WiMAX, IEEE 802.11, DECT, 0G, 1G, 2G, 3G or 4G cellular standards, Bluetooth, or the like, without limitation.

The terms "computer" or "computing device," as used in this disclosure, means any machine, device, circuit, component, or module, or any system of machines, devices, circuits, components, modules, or the like, which are capable of manipulating data according to one or more instructions, such as, for example, without limitation, a processor, a microprocessor, a central processing unit, a general purpose computer, a super computer, a personal computer, a laptop computer, a palmtop computer, a notebook computer, a desktop computer, a workstation computer, a server, a server farm, a computer cloud, or the like, or an array of processors, microprocessors, central processing units, general purpose computers, super computers, personal computers, laptop computers, palmtop computers, notebook computers, desktop computers, workstation computers, servers, or the like, without limitation.

The term "computer-readable medium," as used in this disclosure, means any storage medium that participates in providing data (for example, instructions) that can be read by a computer. Such a medium can take many forms, including non-volatile media and volatile media. Non-volatile media can include, for example, optical or magnetic disks and other persistent memory. Volatile media can include dynamic random access memory (DRAM). Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. The computer-readable medium can include a "Cloud," which includes a distribution of files across multiple (e.g., thousands of) memory caches on multiple (e.g., thousands of) computers.

Various forms of computer readable media can be involved in carrying sequences of instructions to a computer. For example, sequences of instruction (i) can be delivered from a RAM to a processor, (ii) can be carried over a wireless transmission medium, and/or (iii) can be formatted according to numerous formats, standards or protocols, including, for example, Wi-Fi, WiMAX, IEEE 802.11, DECT, 0G, 1G, 2G, 3G, 4G, or 5G cellular standards, Bluetooth, or the like.

The terms "transmission" and "transmit," as used in this disclosure, refer to the conveyance of signals via electricity, acoustic waves, light waves and other electromagnetic emissions, such as those generated in connection with communications in the radio frequency (RF) or infrared (IR) spectra. Transmission media for such transmissions can include coaxial cables, copper wire and fiber optics, including the wires that comprise a system bus coupled to the processor.

The term "database," as used in this disclosure, means any combination of software and/or hardware, including at least one disclosure and/or at least one computer. The database can include a structured collection of records or data organized according to a database model, such as, for example, but not limited to at least one of a relational model, a hierarchical model, a network model or the like. The database can include a database management system disclosure (DBMS) as is known in the art. The disclosure may include, but is not limited to, for example, a disclosure program that can accept connections to service requests from clients by sending back responses to the clients. The database can be configured to run the disclosure, often under heavy workloads, unattended, for extended periods of time with minimal human direction.

The terms "including," "comprising" and variations thereof, as used in this disclosure, mean "including, but not limited to," unless expressly specified otherwise.

The term "network," as used in this disclosure means, but is not limited to, for example, at least one of a local area network (LAN), a wide area network (WAN), a metropolitan area network (MAN), a personal area network (PAN), a campus area network, a corporate area network, a global area network (GAN), a broadband area network (BAN), a cellular network, the Internet, or the like, or any combination of the foregoing, any of which can be configured to communicate data via a wireless and/or a wired communication medium. These networks can run a variety of protocols not limited to TCP/IP, IRC or HTTP.

The term "server," as used in this disclosure, means any combination of software and/or hardware, including at least one disclosure and/or at least one computer to perform services for connected clients as part of a client-server architecture. The server disclosure can include, but is not limited to, for example, a disclosure program that can accept connections to service requests from clients by sending back responses to the clients. The server can be configured to run the disclosure, often under heavy workloads, unattended, for extended periods of time with minimal human direction. The server can include a plurality of computers configured, with the disclosure being divided among the computers depending upon the workload. For example, under light loading, the disclosure can run on a single computer. However, under heavy loading, multiple computers can be required to run the disclosure. The server, or any if its computers, can also be used as a workstation.

Devices that are in communication with each other need not be in continuous communication with each other, unless expressly specified otherwise. In addition, devices that are in communication with each other may communicate directly or indirectly through one or more intermediaries.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

The invention encompassed by the present disclosure has been described with reference to the accompanying drawings, which form a part hereof, and which show, by way of illustration, example implementations and/or embodiments. As such, the figures and examples above are not meant to limit the scope of the present disclosure to a single implementation, as other implementations are possible by way of interchange of some or all of the described or illustrated elements, without departing from the spirit of the present disclosure. Among other things, for example, the disclosed subject matter can be embodied as methods, devices, components, or systems.

Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

Furthermore, it is recognized that terms used herein can have nuanced meanings that are suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter can be based upon combinations of individual example embodiments, or combinations of parts of individual example embodiments.

The foregoing description of the specific implementations will so fully reveal the general nature of the disclosure that others can, by applying knowledge within the skill of the relevant art(s) (including the contents of the documents cited and incorporated by reference herein), readily modify and/or adapt for various disclosures such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown of drawings are shown accordingly to one example and other dimensions can be used without departing from the present disclosure.

While various implementations of the present disclosure have been described above, it should be understood that they have been presented by way of example, and not limitation. It would be apparent to one skilled in the relevant art(s) that various changes in form and detail could be made therein without departing from the spirit and scope of the disclosure. Thus, the present disclosure should not be limited by any of the above-described example implementations, and the invention is to be understood as being defined by the recitations in the claims which follow and structural and functional equivalents of the features and steps in those recitations.

What is claimed:

1. A computer-implemented method for drawing quality review, the method comprising:
   receiving, by at least one computing device configured by executing instructions, information representing an electronic drawing;
   processing, by the at least one computing device, the information representing the electronic drawing to locate and access the electronic drawing;
   accessing, by the at least one computing device, a template configuration file that corresponds with a category of the electronic drawing;
   generating, by the at least one computing device using the template configuration file, an item specification, wherein the item specification includes information representing items to be reviewed in the electronic drawing for compliance with at least one rule identified in the template configuration file;
   for each respective one of the items in the item specification:
      determining, by the at least one computing device, whether the respective item is present in the electronic drawing and complies with at least one rule identified in the template configuration file; and
      generating, by the at least one computing device, information representing whether the respective item is present in the electronic drawing and complies with at least one rule identified in the template configuration file; and
   transmitting, by the at least one computing device, the generated information to at least one computing device.

2. The method of claim 1, wherein determining whether the respective item is present in the electronic drawing further comprises:
   accessing in the item specification, by the at least one computing device, at least two coordinates associated with the respective item, wherein the at least two coordinates representing a location in the electronic drawing where the respective item is located; and
   processing, by the at least one computing device, the electronic drawing using the at least two coordinates to locate the respective item in the electronic drawing.

3. The method of claim 1, wherein determining whether the respective item complies with at least one rule identified in the template configuration file further comprises:
   accessing in the item specification, by the at least one computing device, at least one rule associated with the respective item;
   processing, by the at least one computing device, the electronic drawing to extract the respective item from the electronic drawing; and
   comparing, by the at least one computing device, the extracted respective item with the at least one rule.

4. The method of claim 1, wherein determining whether the respective item is present in the electronic drawing further comprises:
   identifying, by the at least one computing device using information in the template configuration file, that the respective item includes a plurality of words, a plurality of numbers, or a combination of at least one word and at least one number;
   processing, by the at least one computing device, the electronic drawing to extract each of the plurality of words, the plurality of numbers, or the combination of at least one word and at least one number; and
   concatenating, by the at least one computing device, the extracted plurality of words, the extracted plurality of numbers, or the extracted combination of at least one word and at least one number.

5. The method of claim 1, wherein generating the information representing whether the respective item is present in the electronic drawing and complies with at least one rule identified in the template configuration file comprises updating the item specification.

6. The method of claim 1, further comprising:
   configuring the at least one computing device with robotic process automation, and further wherein the steps of:
   receiving the information representing an electronic drawing,
   processing the information representing the electronic drawing to locate and access the electronic drawing,
   accessing the template configuration file,
   generating the item specification,
   determining whether the respective item is present and complies with the at least one rule,
   generating the information, and
   transmitting the information occur automatically as a function of the at least one computing device executing the robotic process automation.

7. The method of claim 1, further comprising:
   converting, by the at least one computing device, the electronic drawing from a first file format to a second file format prior to determining whether the respective item is present in the electronic drawing.

8. The method of claim 1, further comprising:
   generating, by the at least one computing device, the template configuration file prior to receiving, by at least one computing device, the information representing the electronic drawing, wherein the template configuration file includes data representing categories and items that are required of the electronic engineering drawing, data identifying where respective items within the electronic drawing are located, and quality control checks that are to be performed on electronic drawing.

9. The method of claim 1, wherein generating the information representing whether the respective item is present in the electronic drawing and complies with at least one rule identified in the template configuration file further comprises:

generating, by the at least one computing device, a report that identifies:

each respective item identified in the template configuration file; and         whether respective item complies with the at least one rule identified in the template configuration file; and     transmitting, by the at least one computing device, the report to at least one other computing device.

10. The method of claim 1, wherein the electronic drawing is an engineering drawing.

11. A computer-implemented system for drawing quality review, the system comprising:

at least one computing device, wherein the at least one computing device is configured by executing instructions for:

receiving information representing an electronic drawing;

processing the information representing the electronic drawing to locate and access the electronic drawing;

accessing a template configuration file that corresponds with a category of the electronic drawing;

generating, using the template configuration file, an item specification, wherein the item specification includes information representing items to be reviewed in the electronic drawing for compliance with at least one rule identified in the template configuration file;

for each respective one of the items in the item specification:

determining whether the respective item is present in the electronic drawing and complies with at least one rule identified in the template configuration file; and             generating information representing whether the respective item is present in the electronic drawing and complies with at least one rule identified in the template configuration file; and         transmitting the generated information to at least one computing device.

12. The system of claim 11, wherein determining whether the respective item is present in the electronic drawing further comprises:

the at least one computing device, further configured by executing instructions for:

accessing in the item specification at least two coordinates associated with the respective item, wherein the at least two coordinates representing a location in the electronic drawing where the respective item is located; and         processing the electronic drawing using the at least two coordinates to locate the respective item in the electronic drawing.

13. The system of claim 11, wherein determining whether the respective item complies with at least one rule identified in the template configuration file further comprises:

the at least one computing device, further configured by executing instructions for:

accessing in the item specification at least one rule associated with the respective item;

processing the electronic drawing to extract the respective item from the electronic drawing; and         comparing the extracted respective item with the at least one rule.

14. The system of claim 11, wherein determining whether the respective item is present in the electronic drawing further comprises:

the at least one computing device, further configured by executing instructions for:

identifying, using information in the template configuration file, that the respective item includes a plurality of words, a plurality of numbers, or a combination of at least one word and at least one number;

processing the electronic drawing to extract each of the plurality of words, the plurality of numbers, or the combination of at least one word and at least one number; and         concatenating the extracted plurality of words, the extracted plurality of numbers, or the extracted combination of at least one word and at least one number.

15. The system of claim 11, wherein generating the information representing whether the respective item is present in the electronic drawing and complies with at least one rule identified in the template configuration file further comprises:

the at least one computing device, further configured by executing instructions for updating the item specification.

16. The system of claim 11, further comprising:

the at least one computing device, further configured by executing instructions for robotic process automation, and further wherein the steps of:

receiving the information representing an electronic drawing,     processing the information representing the electronic drawing to locate and access the electronic drawing,     accessing the template configuration file,     generating the item specification,     determining whether the respective item is present and complies with the at least one rule,     generating the information, and     transmitting the information occur automatically as a function of the at least one computing device executing the robotic process automation.

17. The system of claim 11, further comprising:

the at least one computing device, further configured by executing instructions for:

converting the electronic drawing from a first file format to a second file format prior to determining whether the respective item is present in the electronic drawing.

18. The system of claim 11, further comprising:

the at least one computing device, further configured by executing instructions for:

generating the template configuration file prior to receiving, by at least one computing device, the information representing the electronic drawing, wherein the template configuration file includes data representing categories and items that are required of the electronic engineering drawing, data identifying where respective items within the electronic drawing are located, and quality control checks that are to be performed on electronic drawing.

19. The system of claim 11, wherein generating the information representing whether the respective item is present in the electronic drawing and complies with at least one rule identified in the template configuration file further comprises:

the at least one computing device, further configured by executing instructions for:

generating a report that identifies:

each respective item identified in the template configuration file; and whether respective item complies with the at least one rule identified in the template configuration file; and transmitting the report to at least one other computing device.

20. The system of claim 11, wherein the electronic drawing is an engineering drawing.

* * * * *